3,274,120
CATALYST COMPOSITION HAVING INCREASED HYDROXYL GROUPS BOUND THERETO AND METHOD FOR PRODUCING SAME
Victor D. Aftandilian, Watertown, Mass., assignor to Cabot Corporation, Boston, Mass., a corporation of Delaware
No Drawing. Filed Feb. 20, 1964, Ser. No. 346,081
20 Claims. (Cl. 252—432)

The present invention relates to finely-divided solids and more particularly to a process for improving the properties of the surface thereof.

It has been disclosed, for example in copending U.S. patent applications 278,414, now abandoned; 11,961, which has matured into U.S. Patent 3,166,541; 21,110, now abandoned; and 15,815, now abandoned, that finely-divided solids having chemically bound thereto certain surface structures comprise valuable catalyst components. It has been further disclosed that the ultimate efficiency of said catalyst components is generally directly proportional to and dependent upon the quantity of hydroxyl groups per gram originally present on the surface of the finely-divided solids.

The present invention resides in part in markedly increasing the number of hydroxyl groups on the surface of finely-divided solids, thereby vastly improving the efficiency of said solids, for example when they are utilized in the process as disclosed in the above-mentioned applications for producing catalyst components.

Accordingly, it is a principal object of the present invention to provide finely-divided solids having improved surface qualities.

It is a further object of the present invention to provide a process for increasing the number of hydroxyl groups on the surface of finely-divided solids.

Other objects of the present invention will in part be obvious and will in part appear hereinafter.

In accordance with the present invention it has been discovered that the quantity of hydroxyl groups on the surface of a finely-divided solid can be markedly increased by (a) reacting existing hydroxyl groups on the surface thereof with certain compounds of Group III and IVa metals, and thereafter (b) hydrolyzing the resulting structures chemically bound to the surface of the solid product of reaction.

Solids suitable for the purposes of the present invention generally include any finely-divided solid having at least about $1 \times 10^{-5}$ equivalents per gram of hydroxyl groups on the surface thereof. Greatly preferred, however, are finely-divided solids having an average particle diameter of less than about 0.1 micron and having between about $1 \times 10^{-4}$ and about $2 \times 10^{-3}$ equivalents per gram of hydroxyl groups on the surface thereof, and which, excepting the hydroxyl groups, are substantially inert to the metal compound to be utilized. For example, extremely finely-divided metal oxides (i.e. having an average particle diameter of less than about 0.1 micron) such as titania, zirconia, thoria, magnesia and silica, and carbon blacks such as channel black are all generally preferred for the purposes of the present invention.

It should be noted that, generally speaking, the ultimate surface hydroxyl group concentration of the improved finely-divided solids produced according to the present invention is largely dependent upon the accomplishment of an actual chemical reaction of controlled extent between hydroxyl groups on the surface of the finely-divided solids and the Group III or IVa metal compounds. Further, it should be borne in mind that, all other factors being equal, the smaller the average particle size of the solid and the larger (within the above limits) the original concentration of hydroxyl groups on the surface thereof, the greater will be the potential surface hydroxyl group concentration achievable in accordance with the present invention. Therefore, it is important for good results to use as the starting material, finely-divided solids having an average particle diameter of less than about 0.1 micron, and preferably less than about 0.05 micron, and having a hydroxyl group content on the surface thereof of at least about $1 \times 10^{-4}$ equivalents per gram. Accordingly, pyrogenic metal or metalloid oxides produced by the vapor phase oxidation or hydrolysis of a corresponding metal or metalloid compound are greatly preferred because they are generally available in average particle diameters of less than about 0.1 micron and normally have substantial quantities of hydroxyl groups on the surface thereof. On the other hand, the hydroxyl group concentration of solids having an original surface hydroxyl group concentration of greater than about $2 \times 10^{-3}$ equivalents per gram is generally not greatly increased because there is a marked tendency for the increased concentration of hydroxyl groups normally imparted in accordance with the present invention to split off water due to intramolecular condensations. Accordingly, the surface hydroxyl group concentration of many solids such as metal oxides produced by precipitation from aqueous solutions which have a hydroxyl group concentration on the surface thereof of above $2 \times 10^{-3}$ equivalents per gram is not normally substantially increased in accordance with the present invention.

Compounds of Group III and IVa metals suitable for the purposes of the present invention generally include those compounds conforming to the formula $$TR_q$$

wherein T is a metal chosen from Groups III and IVa of the Mendeleev Periodic System; each R is a radical chosen from the group consisting of alkyl, aryl, alkoxy, aryloxy, dihydrocarbon substituted amino and the halogens; and $q$ is a number from 3 to 4.

Specific examples of Group III and IVa metal compounds conforming to the above formula and which are suitable for the purposes of the present invention are:

triethylboron—$B(C_2H_5)_3$;
tris(dibutyl methoxy) boron—$B[OCH(C_4H_9)_2]_3$;
triethoxyaluminum—$Al(OC_2H_5)_3$;
tributylaluminum—$Al(C_4H_9)_3$;
trimethylthallium—$Tl(CH_3)_3$;
trisdimethylaminoaluminum—$Al[N(CH_3)_2]_3$;
triphenylgallium—$Ga(C_6H_5)_3$;
tripropylindium—$In(C_3H_7)_3$;
triethoxyboron—$B(OC_2H_5)_3$;
tetrakismethylpropylaminotitanium—
 $Ti[N(CH_3)(C_3H_7)]_4$;
tetrakisdipentylaminotitanium—$Ti[NC_5H_{11})_2]_4$;
bromotrisdipentylaminozirconium—$[(C_5H_{11})_2N]_3ZrBr$;
butyldichloroaluminum—$C_4H_9AlCl_2$;
trihexyloxyboron—$B(OC_6H_{13})_3$;
boron trichloride—$BCl_3$;
aluminum trichloride—$AlCl_3$;
titanium tetrachloride—$TiCl_4$;
dibromotitanium dichloride—$Br_2TiCl_2$;
zirconium tetrabromide—$ZrBr_4$;
triethylthallium—$Tl(C_2H_5)_3$;
gallium trichloride—$GaCl_3$;
tricyclohexylboron—$B(C_6H_{11})_3$;
boron tribromide—$BBr_3$;
trimethylboron—$B(CH_3)_3$;

and the like.

It should be noted that while fluoro-compounds conforming to the above formula are suitable for use in the process of the present invention, the use of said compounds generally results in the production of hydrogen fluoride which may attack glassware and certain solids such as silica. Thus, it is generally preferred that compounds capable of forming hydrogen fluoride when reacted with hydroxyl groups on the surface of a finely-divided solid or when hydrolyzed not be utilized in the practice of the present invention.

The conditions under which reaction between the Group III or IVa metal compound and hydroxyl groups on the surface of the solids can be accomplished are subject to considerable variation. However, in order to obtain products possessing a high order of activity and reproducible character and performance, it is normally necessary that the solid and the metal compound be essentially dry and anhydrous (i.e. free of molecular water in any form) at the time said solids are brought into contact with said Group III or IVa metal compound. If the finely-divided solid or the metal compound to be utilized contains molecular water in any form and/or tends to adsorb same on exposure to humid atmospheres, etc., it should be dried immediately before use or, after drying, must be maintained continuously out of contact with water vapor until utilized. If the precaution of using a substantially anhydrous finely-divided solid or metal compound is not observed, the desired chemical reaction either does not occur at all or does not predominate to the extent necessary to produce a desirable product.

The desired reaction can be carried out by contacting the solid with the metal compound, preferably a solution thereof in an inert hydrocarbon medium, and maintaining the two reactants in intimate contact for a period of time sufficient to effect the desired chemical reaction resulting in the chemical bonding of the Group III or IVa metal to at least one oxygen atom in the surface of the finely-divided solid. It is believed, although there is no intent to be bound by this explanation, that the following illustrative equations wherein in Equations 1 and 2 silica represents the finely-divided solid and titanium tetrachloride represents a Group IVa metal compound, and wherein Equations 3 and 4 alumina represents the finely-divided solid and butyldimethoxyboron represents a Group III metal compound correctly illustrate typical reactions:

EQUATION 1

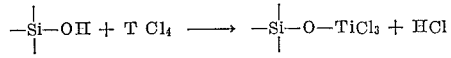

EQUATION 2

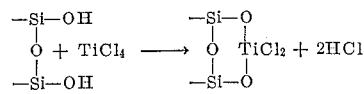

EQUATION 3

EQUATION 4

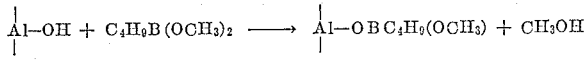

In general, the quantity of Group III or IVa metal compound, the reaction temperature and time, and other factors should be chosen so as to minimize as much as possible the reaction typified by Equation 2 for reasons that will be set forth in detail hereinafter.

The length of time required to effect a given amount of the above reaction is largely dependent upon the temperature of the reaction mixture. Generally speaking, any temperature between about 0° C. and about 300° C., can be used satisfactorily, but room temperature or higher will generally be used. Assuming provision is made for intimate contact of the dry finely-divided solid and the metal compound, the time required to accomplish to a substantial extent, the desired chemical reaction generally varies from periods of a few minutes at temperatures of about 150° C. or higher, to periods of days for temperatures of about 25° C. Temperatures substantially higher than about 300° C., e.g. 500° C., are normally completely needless.

Although use of Group III and IVa metal compounds in solution form gives excellent results, reaction of said compounds with the finely-divided solid can also be effected if the latter is exposed to sufficient quantities of the vapors of a metal compound under conditions of time and temperature similar to those discussed above. Said vapors can be supplied under their own vapor pressure using a partial vacuum if necessary, or with the aid of a dry, inert carrier gas such as nitrogen. This vapor phase treatment can be accomplished in any suitable manner such as by circulating the vapors through the solid in a fixed or moving bed reactor.

Subsequent to the reaction of the finely-divided solid with the metal compound, hydrolysis of the surface reacted solid is effected by contacting said solid with molecular water. The manner in which said hydrolysis is accomplished is normally not critical. For instance, I find it convenient to place the surface reacted solid in a fixed bed apparatus and thereafter flow steam or an inert gas saturated with water vapor through the bed. Generally speaking, the temperature at which hydrolysis is accomplished is also subject to wide variation, although obviously the higher the temperature, the faster the hydrolysis reaction will normally be completed. Temperatures from above about the freezing point of water to about 300° C. are generally entirely satisfactory, although room temperature to about 125° C. will usually be preferred. It is pointed out that following said hydrolysis reaction, any excess moisture, i.e. molecular water, associated with the surface of the solid should be removed at temperatures as low as possible in order to minimize intra- and inter-molecular condensation of the newly formed hydroxyl groups and the splitting off of water, the amount of condensation, all other factors being equal, normally increasing with temperature.

The following equations are believed to correctly illustrate the hydrolysis of the surface structures chemically bonded to the surface of the solid reaction products of Equations 1, 2, 3 and 4 respectively:

EQUATION 5

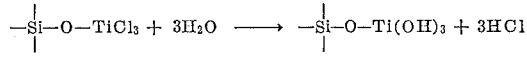

EQUATION 6

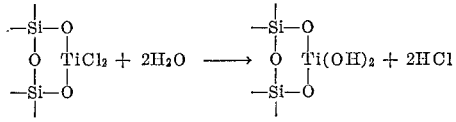

EQUATION 7

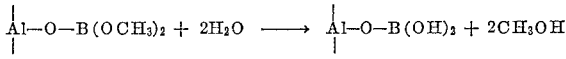

EQUATION 8

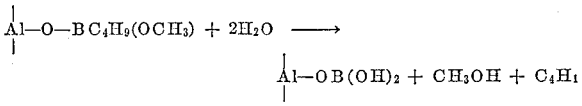

Clearly, the reaction illustrated by Equation 6 should normally be minimized as much as possible by minimizing as much as possible the reaction typified by Equation 2 as a net increase in hydroxyl group concentration is not normally achieved thereby.

It is often desirable that the improved solids resulting from the process of the present invention be substantially free from reaction by-products prior to the subsequent use thereof. It is particularly desirable that, when present, hydrogen halide by-products be removed from the improved solids of the present invention prior to utilization in the processes of the copending applications mentioned hereinbefore. Removal of said by-products can generally be conveniently accomplished in any number of ways during the reaction of the solid with the Group III or IVa metal compound and during the hydrolysis reactions. For instance, a particularly convenient method of hydrogen halide removal comprises sweeping the reaction zone continuously with a gas such as nitrogen or argon during the reaction of the finely-divided solid with the metal compound and during hydrolysis of the surface reacted solid.

There follow a number of non-limiting, illustrative examples:

Example 1

There is charged into a 1000 milliliter reaction vessel 10 grams of "Cab-O-Sil," a pyrogenic silica produced by Cabot Corporation, having an average particle diameter of about 10 millimicrons, which silica had been calcined and possessed about 0.3 milliequivalents per gram of hydroxyl groups on the surface thereof. There is then added to the reaction vessel 700 milliliters of heptane and the resulting slurry is dried azeotropically by periodic distillation for about 20 hours until the remaining slurry comprises a volume of about 500 milliliters. Next, without exposure to the atmosphere, there is charged to said slurry 10 millimoles of titanium tetrachloride. The reaction mixture is then maintained at about 50° C. for about 24 hours while the HCl produced is removed by a stream of dry nitrogen which is passed through a scrubber containing dilute caustic. Subsequently, it is found that the quantity of HCl produced is about 0.3 milliequivalent per gram of silica thereby verifying that the concentration of hydroxyl groups chemically bound to the surface of said silica was about 0.3 milliequivalent per gram.

Example 2

There is charged to a 1000 milliliter reaction vessel 10 grams of "Cab-O-Sil" identical to that utilized in Example 1 and 820 milliliters of heptane and the resulting slurry is dried azeotropically for 20 hours until the remaining slurry comprises a volume of about 600 milliliters. Next, without exposure to the atmosphere, there is charged to said slurry about 2.9 millimoles of tetrakisdiethylaminotitanium and the resulting mixture is heated to and maintained at about refluxing temperatures for about 12 hours while the diethylamine produced is removed by nitrogen sweep. The extent of the reaction between hydroxyl groups on the surface of the silica and the tetrakisdiethylaminotitanium is determined by measuring the quantity of diethylamine that is produced and by testing the liquid contents of the vessel for the absence therein of tetrakisdiethylaminotitanium and said silica is found to have 2.9 milliatoms of titanium chemically bound to the surface thereof. Next, the slurry is cooled to a temperature of about 60° C. and nitrogen, saturated with water vapor and heated to about 60° is bubbled beneath the surface thereof for about 6 hours while the diethylamine produced is swept out of the vessel by the nitrogen.

The slurry is allowed to stand for about 10 hours. Next, about 200 milliliters of heptane is charged to the slurry and the resulting slurry is again azeotropically dried by periodic distillation for about 20 hours until about 300 milliliters of distillate is removed. Without exposure to the atmosphere, there is then charged to said slurry 10 millimoles of titanium tetrachloride. The reaction mixture is then maintained at about 50° C. for about 24 hours while the HCl produced is removed by a stream of dry nitrogen. Subsequently, it is found that the quantity of HCl produced is about 0.8 milliequivalent per gram of silica and accordingly that about 0.8 milliequivalent of hydroxyl groups per gram of silica are chemically bound to the surface of the silica.

Example 3

A sample of "Alon," a pyrogenic, substantially nonporous, alumina produced by Deutsche Gold- und Silber-Scheideanstalt vormals Roessler, having an average particle diameter of about 10–40 millimicrons is determined to possess a hydroxyl group content on the surface thereof of about 0.7 milliequivalent per gram.

There is then charged to a static bed apparatus comprising a glass column 6 cms. in diameter and 50 cms. in length, 20 grams of "Alon" previously dried by heating in a vacuum oven for 24 hours at a temperature of about 110° C. Next, there is continuously recirculated through said alumina bed, 4 liters of dry nitrogen heated to about 160° C. while over a period of two hours, about 12 millimoles of boron trichloride is introduced into said recirculating nitrogen stream.

After about 8 hours, recirculation of said stream is arrested and the entire system is flushed with hot (100° C.) dry nitrogen, the effluent gases therefrom being led into a dilute caustic scrubber. The extent of reaction between the boron trichloride and hydroxyl groups on the surface of the alumina is determined by measuring the amount of HCl produced and by testing the gaseous effluent for the absence therein of boron trichloride and it is found that about 14 milliequivalents of HCl were produced and that about 12 milliatoms of boron are chemically bound to the surface of said alumina. Next, nitrogen saturated with water vapor and heated to about 50° C., is passed through the bed, the gaseous effluent from the bed being passed through a scrubber containing dilute caustic. After about 24 hours, said water-saturated nitrogen stream is discontinued and a dry nitrogen stream heated to about 50° C. is passed through the bed for an additional 8 hours. The HCl that had been removed from said bed is then measured and is found to be about 22 milliequivalents which corresponds to a hydroxyl group concentration of about 1.1 milliequivalents per gram of treated alumina.

Example 4

To a static bed apparatus of the type described in Example 3, there is charged 100 grams of "Vulcan 9," a furnace carbon black produced by Cabot Corporation having an average particle size of about 20 millimicrons and a hydroxyl group content on the surface thereof previously determined to be about 0.05 milliequivalent per gram. The carbon black is then dried for about 10 hours by passing therethrough a continuous stream of dry nitrogen heated to about 140° C. Next, there is continuously recirculated through said bed, 4 liters of dry nitrogen heated to about 150° C. while there is introduced into said stream over a period of about 4 hours about 4.9 millimoles of anhydrous aluminum trichloride. After about 12 hours, recirculation of said stream is arrested and the entire system is flushed with warm dry nitrogen, the effluent gases therefrom being led into a dilute caustic scrubber. The extent of reaction between the aluminum trichloride and hydroxyl groups on the surface of the carbon black is determined by measuring the amount of HCl produced and by testing the gaseous effluent for the absence therein of aluminum trichloride and it is found that about 5 milliequivalents of HCl were produced and that about 4.9 milliatoms of aluminum are chemically bound to the surface of said carbon black. Next, nitrogen saturated with water vapor and heated to about 50° C. is passed through the bed, the gaseous effluent from the bed being passed through a scrubber containing dilute caustic. After about 24 hours, said water-saturated nitrogen stream is discontinued and a dry nitrogen stream heated to about 50° C. is substituted therefor for about 10 hours. The contents of the caustic scrubber are analyzed and it is found that about 9 millimoles of HCl have been produced which corresponds to a hydroxyl group concentration of about 0.09 milliequivalent per gram of treated carbon black.

When the above example is repeated with the exception that anhydrous aluminum bromide is utilized instead of anhydrous aluminum chloride, the resulting increase

Example 5

There is charged to a 1000 milliliter reaction vessel 10 grams of "Cab-O-Sil" identical to that utilized in Example 1 and 800 milliliters of isooctane. The resulting slurry is then dried azeotropically for about 20 hours until about 200 milliliters of distillate have been removed. Next, without exposure to the atmosphere, there is charged dropwise to the dried refluxing slurry over a period of about one hour, 2.9 millimoles of titanium tetrachloride dissolved in 200 milliliters of anhydrous isooctane while the reaction mixture is continuously refluxed and swept by dry nitrogen for about 4 hours. Subsequently, the extent of the reaction between hydroxyl groups on the surface of the silica and the titanium tetrachloride is determined by measuring the quantity of HCl that is produced and by testing the liquid contents of the vessel for the absence therein of titanium tetrachloride and said silica is found to have 2.9 milliatoms of titanium chemically bound to the surface thereof. Next, the slurry is cooled to a temperature of about 50° C., and nitrogen saturated with water vapor and heated to about 50° C. is bubbled beneath the surface thereof for about 8 hours. The slurry is then again azeotropically dried by periodic distillation until about 200 milliliters of distillate are removed. There is then charged to said slurry 8 millimoles of titanium tetrachloride and the reaction mixture is maintained at about 50° C. for about 24 hours while the HCl produced is removed by a stream of dry nitrogen. Subsequently, it is found that 7 milliequivalents of HCl are produced which corresponds to a hydroxyl group concentration of about 0.7 milliequivalent per gram of treated silica.

When the above procedure is duplicated with the exception that tetraethoxytitanium is utilized in place of titanium tetrachloride and the extent of the reaction between hydroxyl groups on the surface of the silica and the tetraethoxytitanium is determined by measuring the amount of ethanol produced rather than the HCl produced, a similar increase in hydroxyl group concentration is found.

Obviously, many changes can be made in the above examples and disclosures without departing from the scope of the present invention.

For instance, Group III or IV$a$ metal compounds other than those mentioned in the above examples are also suitable, such as trihexyloxyboron, zirconium tetrachloride, triisobutylaluminum, dibromotitanium dichloride, and the like.

Accordingly, it is intended that the above disclosure be regarded as illustrative and as in no way limiting the scope of the invention.

What I claim is:
1. A new composition comprising a finely-divided inorganic solid having oxygen atoms chemically bound in the surface thereof and carrying in chemical combination at least about $1 \times 10^{-5}$ equivalents per gram of surface structures conforming to the formula

$$T(OH)_c$$

wherein T is a metal chosen from the group consisting of the elements of Groups III and IV$a$; each (OH) is a hydroxyl group; $c$ is a number from 1 to 3; and wherein said structures are chemically linked from T to at least one oxygen atom chemically bound to the surface of said solid.

2. The composition of claim 1 wherein in said surface structures conforming to the formula $$T(OH)_c$$

$c$ is 3.

3. The composition of claim 1 wherein in said surface structures conforming to the formula $$T(OH)_c$$

$c$ is 2.

4. The composition of claim 1 wherein in said surface structures conforming to the formula $$T(OH)_c$$

T is an element of Group III.

5. The composition of claim 1 wherein in said surface structures conforming to the formula $$T(OH)_c$$

T is an element of Group IV$a$.

6. The composition of claim 1 wherein the concentration of said surface structures is between about $1 \times 10^{-4}$ and about $2 \times 10^{-3}$ equivalents per gram.

7. The composition of claim 1 wherein said finely-divided solid is chosen from the group consisting of silica and alumina.

8. A process for increasing the number of hydroxyl groups chemically bound to the surface of a finely-divided inorganic solid which comprises
(a) reaction hydroxyl groups originally chemically bound to the surface of a finely-divided solid with a compound conforming to the formula $$TR_q$$

wherein T is a metal chosen from the group consisting of the elements of Groups III and IV$a$; each R is any radical chosen from the group consisting of alkyl, aryl, alkoxy, aryloxy, dihydrocarbon substituted amino and the halogen; and $q$ is a number from 3 to 4; and
(b) hydrolyzing the resulting surface structures.

9. The process of claim 8 wherein in the formula $$TR_q$$

each R is a halogen radical.

10. The process of claim 8 wherein in the formula $$TR_q$$

each R is an alkyl radical.

11. The process of claim 8 wherein in the formula $$TR_q$$

each R is an aryl radical.

12. The process of claim 8 wherein in the formula $$TR_q$$

each R is a dihydrocarbon substituted amino radical.

13. The process of claim 8 wherein said original concentration of hydroxyl groups is at least about $1 \times 10^{-5}$ equivalents per gram.

14. The process of claim 8 wherein said solid has an average particle diameter of less than about 0.1 micron and has between about $1 \times 10^{-4}$ and about $2 \times 10^{-3}$ equivalents per gram of hydroxyl groups originally attached thereto.

15. The process of claim 8 wherein in the formula $$TR_q$$

T is an element of Group III.

16. The process of claim 8 wherein in the formula $$TR_q$$

T is aluminum.

17. The process of claim 8 wherein in the formula $$TR_q$$

T is boron.

18. The process of claim 8 wherein in the formula $$TR_q$$

T is an element of Group IV$a$.

19. The process of claim 8 wherein in the formula $$TR_q$$

T is titanium.

20. The process of claim 8 wherein said hydrolysis is accomplished at temperatures of between about 20° C. and about 125° C.

References Cited by the Examiner

UNITED STATES PATENTS

| | | | |
|---|---|---|---|
| 2,912,421 | 11/1959 | Juveland et al. | 252—431 |
| 3,166,541 | 1/1965 | Orzechowski et al. | 260—93.7 |
| 3,166,543 | 1/1965 | Orzechowski et al. | 252—429 |

OSCAR R. VERTIZ, *Primary Examiner.*

BENJAMIN HENKIN, *Examiner.*

H. S. MILLER, A. GREIF, *Assistant Examiners.*